United States Patent
Ramadoss et al.

(10) Patent No.: US 9,025,655 B1
(45) Date of Patent: May 5, 2015

(54) TRANSMITTER TRAINING USING RECEIVER EQUALIZER COEFFICIENTS

(71) Applicant: LSI Corporation, San Jose, CA (US)

(72) Inventors: Rajesh Ramadoss, Millburn, NJ (US); Mohammad S. Mobin, Orefield, PA (US); Thomas F. Gibbons, Jr., Macungie, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/072,895

(22) Filed: Nov. 6, 2013

Related U.S. Application Data

(60) Provisional application No. 61/892,206, filed on Oct. 17, 2013.

(51) Int. Cl.
*H03H 7/30* (2006.01)
*H04L 25/03* (2006.01)

(52) U.S. Cl.
CPC ................................ *H04L 25/03885* (2013.01)

(58) Field of Classification Search
CPC .................. H04L 25/03019; H04L 25/03057; H04L 27/01; H04L 25/03343; H04B 3/145
USPC .................. 375/232, 233, 219, 285
See application file for complete search history.

(56) References Cited

U.S. PATENT DOCUMENTS

| | | | |
|---|---|---|---|
| 5,978,473 A | 11/1999 | Rasmusson | |
| 7,016,406 B1 | 3/2006 | Phanse et al. | |
| 7,440,497 B2 | 10/2008 | Balan et al. | |
| 7,599,461 B2 | 10/2009 | Aziz et al. | |
| 7,616,686 B2 | 11/2009 | Aziz et al. | |
| 7,636,408 B2 | 12/2009 | Bau et al. | |
| 8,229,020 B2 * | 7/2012 | Huang et al. | 375/285 |
| 8,369,470 B2 | 2/2013 | Mobin et al. | |
| 8,472,513 B2 * | 6/2013 | Malipatil et al. | 375/233 |
| 2010/0046600 A1 * | 2/2010 | Zerbe et al. | 375/233 |
| 2010/0177816 A1 * | 7/2010 | Malipatil et al. | 375/233 |
| 2010/0329325 A1 * | 12/2010 | Mobin et al. | 375/232 |
| 2014/0029651 A1 * | 1/2014 | Zhong | 375/219 |

OTHER PUBLICATIONS

Johns et al.; Continuous-Time LMS Adaptive Recursive Filters; Trans. on CAS; Feb. 11, 1991.
Patentability Search Report for L13-1022.

* cited by examiner

*Primary Examiner* — Kenneth Lam
(74) *Attorney, Agent, or Firm* — Sheridan Ross P.C.

(57) ABSTRACT

A method of adjusting a post-cursor tap weight in a transmitter FIR filter in a high-speed digital data transmission system. A receiver, over a forward channel, receives a signal from the transmitter and equalizes the received signal using an adaptive analog equalizer coupled to the forward channel and a decision feedback equalizer (DFE) coupled to the analog equalizer. A gain coefficient used to adjust the peaking by the analog equalizer is adapted using an error signal generated by the DFE. The post-cursor tap weight of the transmitter filter is adjusted up or down based on a comparison of the gain coefficient to a set. of limits. The post-cursor tap weight is transmitted to the transmitter over a reverse channel and then equalizers in the receiver readapt. Alternatively, eye opening data and a DFE tap coefficient are used to determine whether the post-cursor tap weight is adjusted up or down.

20 Claims, 8 Drawing Sheets

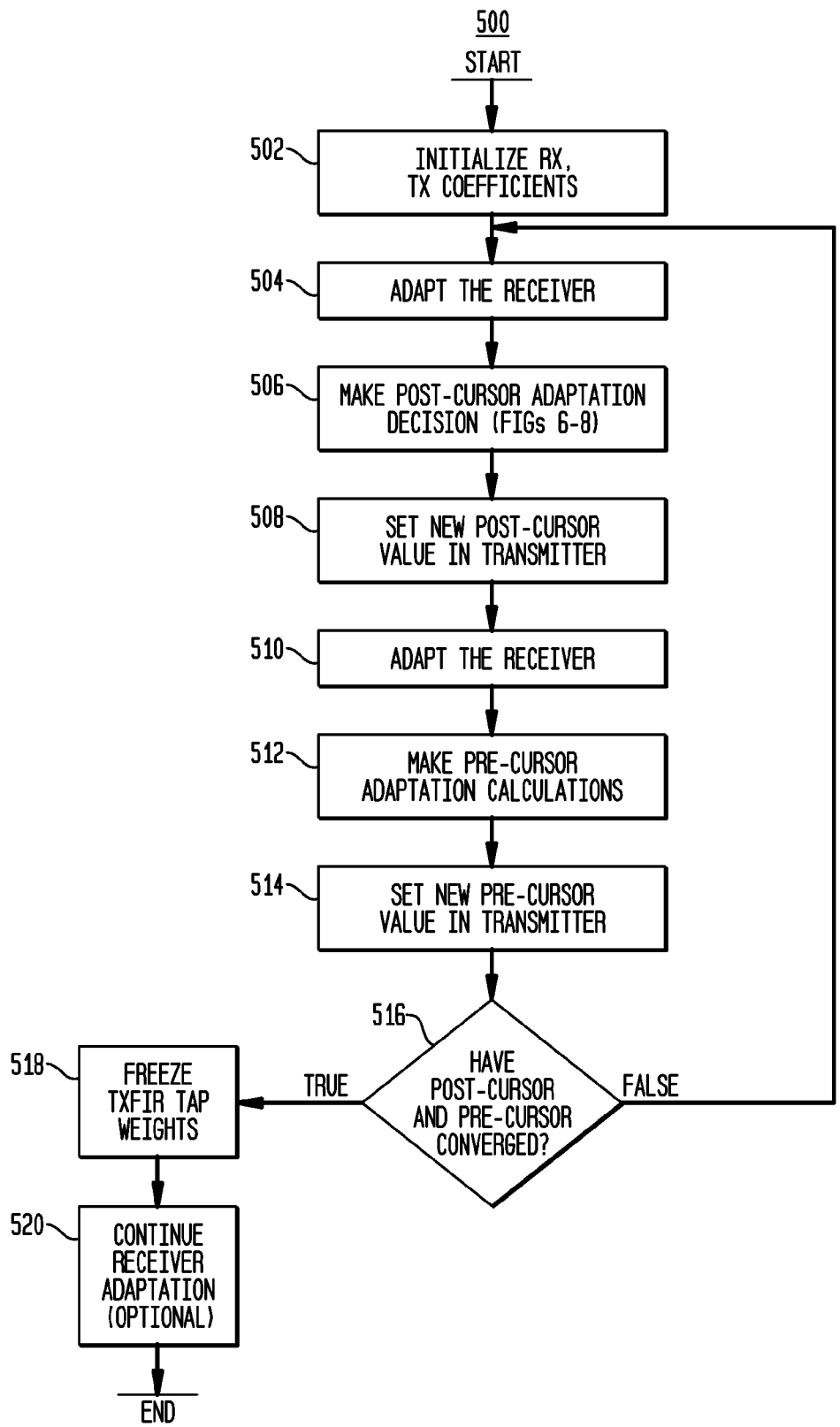

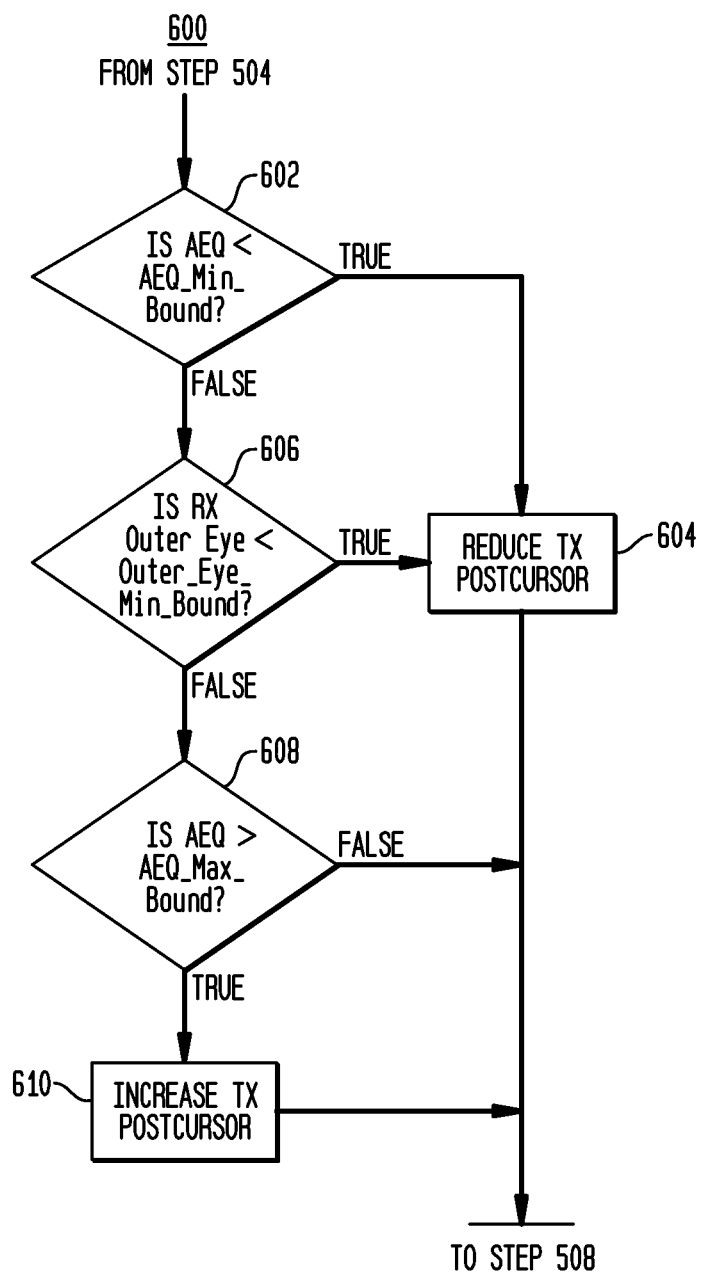

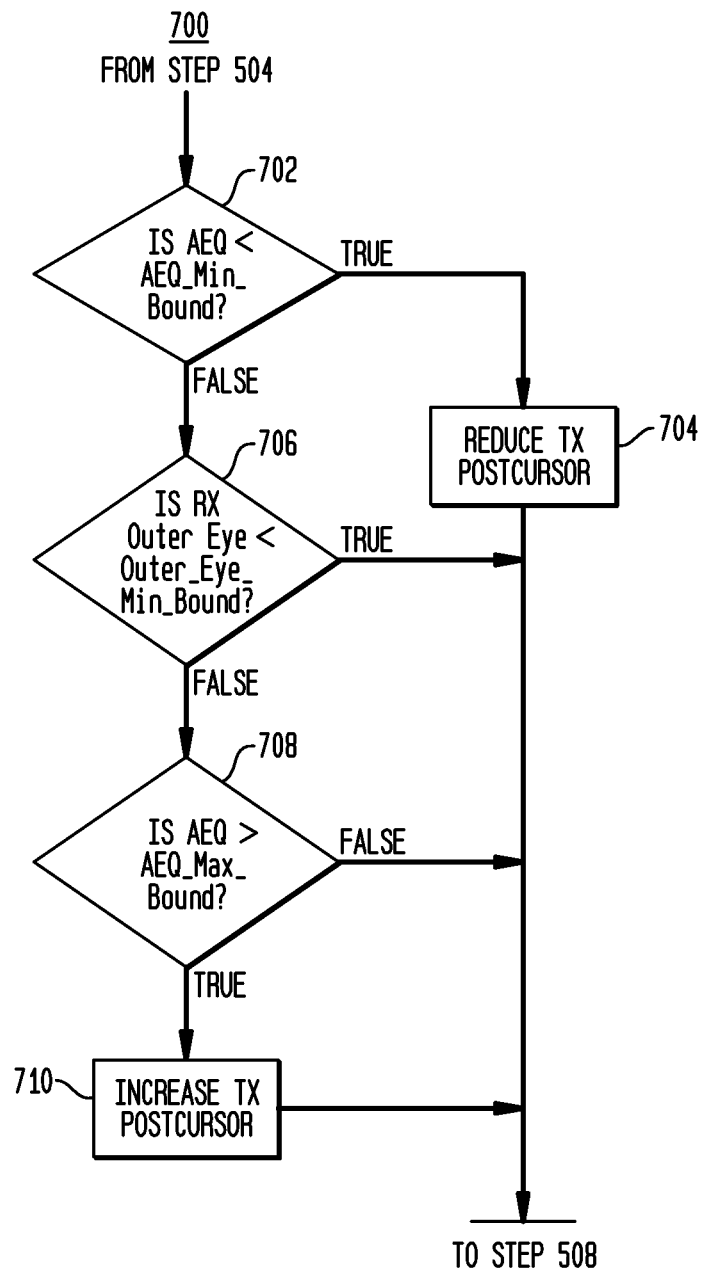

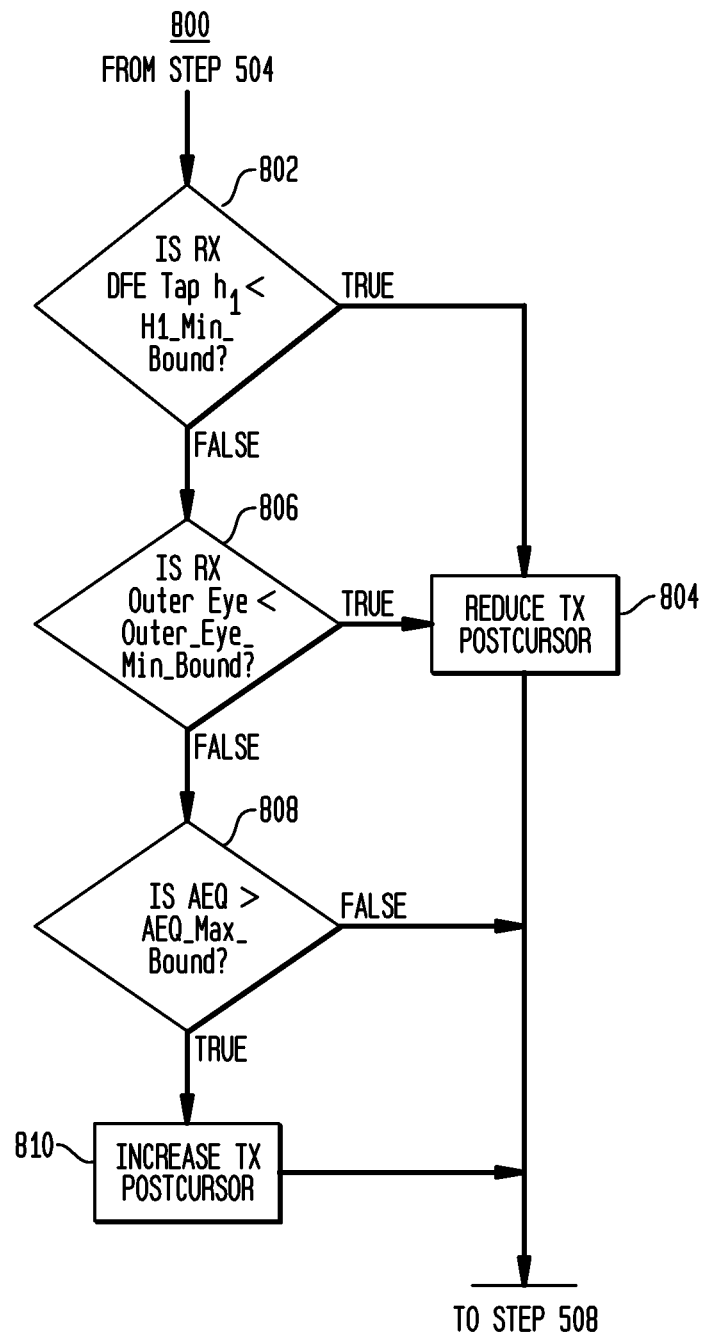

TRANSMITTER TRAINING USING RECEIVER EQUALIZER COEFFICIENTS

CROSS REFERENCE TO RELATED APPLICATIONS

This application claims priority to U.S. Provisional Patent Application Ser. No. 61/892,206 filed on 17 Oct. 2013, the teachings of which are incorporated herein in its entirety by reference.

BACKGROUND

1. Field of the Invention

The present invention relates generally to high-speed digital data transmission systems.

2. Description of the Related Art

Multi-gigabit per second (Gbps) communication between various chips on a circuit board or modules on a backplane has been in use for quite a while. Data transmission is usually from a transmitter that serializes parallel data for transmission over a communication media, such as twisted pair conductors as a cable or embedded in a backplane, fiber optic cable, or coaxial cable(s), to a receiver that recovers the transmitted data and deserializes the data into parallel form. However, data transmission greater than 8 Gbps over communication paths has been difficult to achieve because various signal impairments, such as intersymbol interference (ISI), crosstalk, echo, and other noise, can corrupt the received data signal to such an extent that a receiver is unable to recover the transmitted data at the desired high data rate with an acceptable level of error performance.

Various techniques are employed to improve the performance of the receiver. One technique is to provide the receiver with an analog front end (AFE), having a variable gain amplifier to assure signal linearity within a desired dynamic range and a multi-band adjustable analog (linear) equalizer (AEQ) to compensate for frequency-dependent losses, and an adaptive decision feedback equalizer to compensate for interference and other non-linear distortions of the channel. Even though the quality (e.g., the amount of "eye opening") of the received signal can be improved by the AEQ, the complexity of the AEQ needed to handle different serial communication protocols (e.g., PCIe Gen3, 12 G SAS, 16GFC, and 10GBASE-KR, all of which are included herein by reference in their entirety) over communication channels ranging from short, highly reflective channels to long-span channels with a poor insertion loss-to-crosstalk ratio (ICR), may be too complicated to implement cost effectively. Further, the amount of frequency-dependent distortion and interference may exceed the capability of the AEQ such that it cannot fully correct for them, resulting in unacceptably poor performance.

One way to improve the quality of the received signal is for the signal transmitter, coupled to the receiver, to drive the channel with signals that have been pre-distorted by a filter. One such filter used to pre-distort the transmitted signal is a finite-impulse response (FIR) filter with adjustable coefficients or tap weights, referred to herein as a TXFIR filter. For lower speed applications, the filter tap weights might be predetermined, i.e., selected from a set of preset filter tap weights, based on the design of the channel and the protocol being implemented. However, with the need for high-speed (e.g., 8 Gbps and above) applications, using a fixed set of TXFIR filter tap weights has not worked well for all transmitter/channel/receiver implementations. Even similar implementations may require significantly different TXFIR filter tap weights values for proper operation due to chip-to-chip electrical parameter variations of the integrated circuits embodying the transmitter and the receiver and the electrical characteristics of the channel media as well.

The standards bodies that administer the various serial communication protocols mentioned above recognized the shortcomings of using fixed TXFIR filter tap weights and provided in the protocols a feedback mechanism utilizing a back-channel to allow for adjustment of the TXFIR filter tap weights during initialization of the transmitter and receiver. The protocols allow for the receiver to adapt the TXFIR filter tap weights by receiving a known data pattern from the transmitter and communicating new filter tap weights values to the transmitter via the back-channel.

Techniques used to adapt the TXFIR filter tap weights include gradient-based approaches, such as the widely used least-mean-squared (LMS) algorithm, that generally rely on the AFE being essentially distortion-free and invulnerable to large signal compression and PVT variations, none of which is possible in existing small geometry implementation technology, e.g., 28 nm and smaller. Moreover, the gradient-based approaches to TXFIR adaptation do not reliably adapt the TXFIR post-cursor tap weight with channel media loss and transmitter launch amplitude variations experienced in typical systems. It has been found that under certain circumstances, various coefficients, such as the coefficient used to set the level of peaking provided by AEQ, saturate at one extreme or another so that the adaptation does not converge, resulting in a failure of communication from the transmitter to the Receiver.

With decreasing process technology geometry and decreasing power supply requirements, transmitter and receiver design for high-speed application is challenging due to increased process-voltage-temperature (PVT) related data path gain variation and power supply headroom-induced signal distortion. The effect of PVT variation is more pronounced at 28 nm and smaller technology. As an example, with a fast process corner at low supply voltage and high operating temperature associated with low transmitter launch on a high loss channel, the AFE might not offer enough signal gain and high frequency signal amplification for error-free communication. Moreover, disproportionate gain variation between a low frequency signal path and a high frequency signal path results in loss of signal fidelity by altering signal linearity. An example of such behavior may be found in a typical compression curve of an exemplary AFE consisting of a low frequency signal path and a high frequency signal path. In a small geometry implementation, it is typical that a DC input signal might suffer 30% attenuation in a low amplitude linear region of the AFE (e.g., 100 mV input) and have a 5 dB compression at large amplitude (e.g., 300 mV input).

On the other hand, with a slow process corner and high supply voltage at low operating temperature associated with a high transmitter launch voltage over a low loss channel, the AFE might exhibit excessive signal compression at higher signal amplitudes and no compression at lower signal amplitudes. This in turn results in loss of signal fidelity by selective signal compression on low frequency and high frequency components of an incoming signal at the receiver. As a result, the conventional data sample phase-aligned error latch-based adaptation algorithms do not develop the correct information for accurate adaptation of receiver coefficients as well as the TXFIR filter tap weights.

Therefore, it is desirable to provide a receiver that can quickly, robustly, and reliably adjust the TXFIR filter tap weights where AFE gain/boost variations and signal linearity challenges resulting from PVT variations exist along with lower power supply-induced signal headroom limitations, thereby improving the overall reliability of communication between the transmitter and the receiver.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

In one embodiment of the invention, a method is described in which a receiver adapts at least one adjustable filter tap weight for a filter in a transmitter coupled to the receiver. The method includes the steps of receiving, over a forward channel, a signal from the transmitter after being filtered by the filter with the adjustable tap weights; equalizing the received signal using an adaptive equalizer having at least one control signal; adjusting the at least one of the transmitter filter tap weight based on the at least one control signal of the equalizer; and transmitting the adjusted at least one transmitter filter tap weight to the transmitter using a reverse channel.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 5 is a flowchart of an exemplary process of adapting receiver coefficients and transmitter filter tap weights;

FIG. 6 is a flowchart of an exemplary process of adapting the transmitter filter tap weights using certain receiver coefficients in conjunction with the exemplary process of FIG. 5 according to one embodiment of the invention;

FIG. 7 is a flowchart of an exemplary process of adapting the transmitter filter tap weights using certain receiver coefficients in conjunction with the exemplary process of FIG. 5 according to an alternative embodiment of the invention; and FIG. 8 is a flowchart of an exemplary process of adapting the transmitter filter tap weights using certain receiver coefficients in conjunction with the exemplary process of FIG. 5 according to another alternative embodiment of the invention.

DETAILED DESCRIPTION

As data rates increase for serializer/deserializer (SERDES) communications applications, the "quality" of the channel media degrades dramatically even over short distances between the ends of the channel. One technique typically used to overcome the poor quality channel and achieve the desired channel performance needed for reliable communications over the degraded channel is to pre-distort the transmitted signal to counteract the effects of the channel on the signal presented to the receiver. For high-speed signaling applications, such as 8 Gbps and faster SERDES applications, the pre-distortion characteristics are adjusted through a back or reverse channel to adapt the pre-distortion to the channel's characteristics. For one example of a reverse channel adaptation technique, see Published U.S. Patent Application 2013-0195154 titled "Transmitter Adaptation Loop Using Adjustable Gain and Convergence Detection" by Mobin et al., incorporated by reference herein in its entirety.

Figure 1:
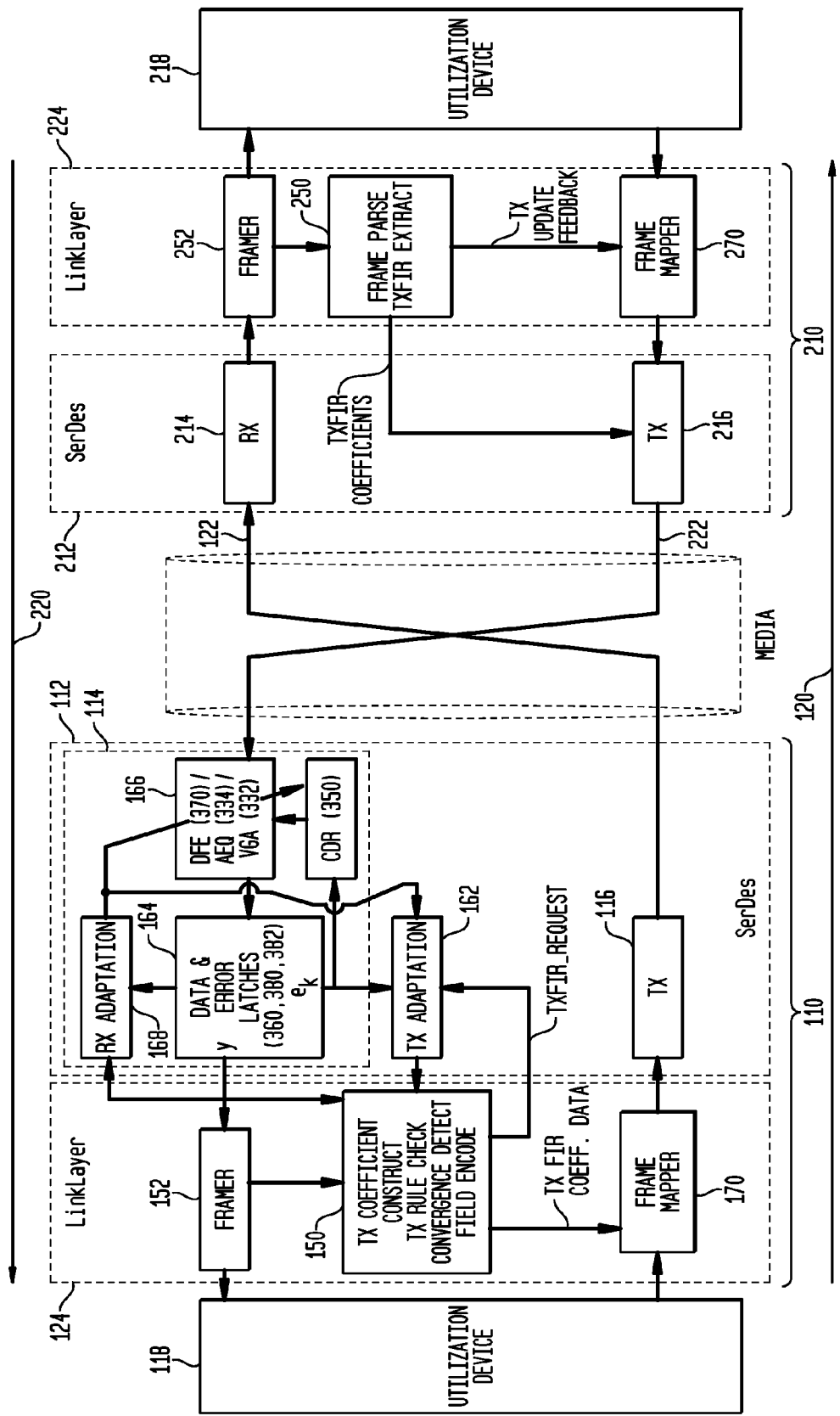
FIG. 1 is a simplified block diagram of a bidirectional serializer/deserializer (SERDES) communication system having a local port and a link partner port.

FIG. 1 is a block diagram of a typical bidirectional communication system 100 that incorporates two ports connected by channel media. One port is referred to herein as a local port 110 and the other as a link partner port 210, also referred to in various standards as downstream and upstream ports, respectively. The local, port 110 controls the link partner port 210 through the use of special data frames. Both ports have a link layer and a serializer-deserializer (SERDES). The link layer is a well-known function (layer two of the seven layer International Organization for Standardization's Open System Interconnection communications system model) that provides the interface between a utilization device that sinks and sources data, and the SERDES. The link layer implements the protocol of the standard being used. The SERDES converts parallel data to serial data and vice-versa for transmission over channel media, such as but not limited to a backplane, metal traces in a substrate, a cable, or a combination thereof.

For purposes here, both ports contain substantially the same functional blocks so that the description herein of functional blocks in one port is applicable to the other port. However, it is understood that ports of different capability, e.g., maximum communication speed, can be used to communicate with each other but might be lacking certain features, e.g., a transmit filter without variable tap weights or a receiver without an analog equalizer.

In the local port 110, the SERDES 112 has a receiver portion 114 and a transmitter portion 116. The SERDES 212 in the link partner port 210 has a receiver portion 214 and transmitter portion 216. The transmitter 116 sends serialized data from a data source in utilization device 118 to the receiver 214 via the aforementioned channel media 122 for delivery to a data sink in the utilization device 218, forming a communication channel 120. Similarly, the transmitter 216 sends serialized data from a data source in utilization device 218 to the receiver 114 via the aforementioned channel media 222 for delivery to a data sink in the utilization device 118, forming a communication channel 220. A utilization device might be a computer, a field-programmable gate array, a storage system, another communication system, or any other device that produces or consumes data. For purposes of this description, a communication channel is a main channel when the channel is carrying either data from one utilization device to another or conveying data during training as will be explained in more detail below, or the communication channel is a back-channel when conveying information regarding the setup, adaptation, or other data related to the operation of the main channel. A channel might be both a main channel and a back-channel during normal operation; e.g., channel 120 might be conveying data from utilization device 118 to utilization device 218 while conveying configuration or performance information (e.g., bit error rate) about the channel 220 to a controller located in the local port 110.

Figure 2:
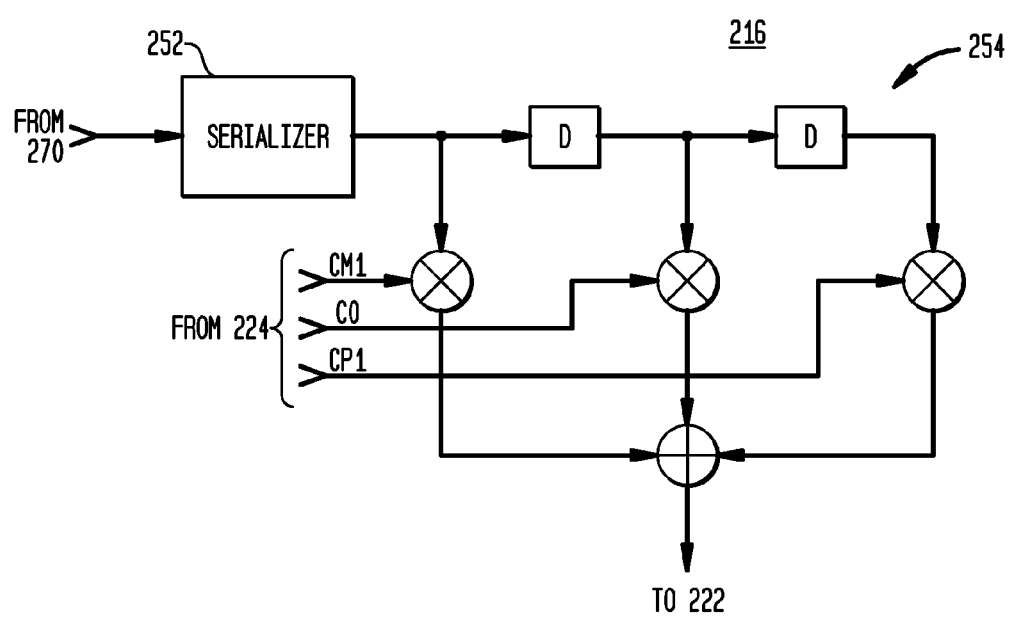
FIG. 2 is a simplified block diagram of an exemplary implementation of the transmitter portion of the ports in FIG. 1.

As will be explained in more detail in relation to FIG. 2, the transmitters 116, 216 each contain a serializer that converts parallel data from the respective link layer into serial data that is filtered by a transmit filter with adjustable filter tap weights, and the filtered serial data is driven onto the respective communication media. The receivers 114, 214 might be of the type shown in FIG. 3 and discussed in more detail below. For purposes here, when instructed to do so, receivers 114, 214 adapt to received data by recursively adjusting the equalizers therein (analog and digital if present) to minimize the error values related to the difference between transmitted data and data decoded by the receiver. The error values represent the quality of signals passing through the communication channel, including all equalizers and filters that the signal passes through. As will be explained in more detail below, the error values from a receiver is also used as input to a process that adapts the transmit filter of the transmitter coupled to the receiver via the respective communication media to further improve the performance of the system 100.

As mentioned above, data to be transmitted is filtered through a transmit filter disposed between a serializer and the communication media to improve the performance of the system 100 by pre-distorting (filtering) the signals applied to the conductors in the channel media. FIG. 2 diagrams the details of an exemplary embodiment of the transmit portion of the SERDES 212, here a serializer 252 and an FIR (TXFIR) filter 254. In this embodiment, a frame mapper 270 in link layer 224 (FIG. 1) drives the serializer 252 that in turn drives the TXFIR filter 254. The TXFIR filter 254 has three tap weights, C0, CM1, and CP1, referred to herein as the main cursor, pre-cursor, and post-cursor, respectively. As described in more detail below, an adaptation algorithm performed in the local port 110 determines the values of at least one of the three TXFIR filter tap weights and these values are transmitted to the port 210 via channel 120 acting as a back-channel and are then loaded into the TXFIR 254 by the link layer 224. The recursive algorithm uses a signal related to the quality of a received signal having a decision-directed detected data pattern and iteratively adjusts the TXFIR filter tap weights based on a filtered gradient of the received signal. An alternative exemplary TXFIR filter is disclosed in "A 1.0625-to-14.025Gb/s Multimedia Transceiver with Full-rate Source-Series-Terminated Transmit Driver and Floating-Tap Decision-Feedback Equalizer in 40nm CMOS" by Quan et al., Proceedings of the 2011 IEEE International Solid-State Circuits Conference, pp. 348-349, incorporated by reference herein in its entirety. The filter tap weights of Quan's FIR filter might be adjusted as described for the TXFIR filter in FIG. 2. The above description of the transmitter 216 also applies to the transmitter 116 (FIG. 1). Similarly, the above-mentioned adaptation process is equally applicable to adapting the TXFIR filter (not shown) in the SERDES 112.

When a request is made to adapt the tap weights of TXFIR filter 254 and coefficients of receiver 114, a processor 150 in the local port 110 sends an adaptation request to transmit (TX) Adaptation unit 162 in the SERDES 112. The TXFIR filter adapts using conventional adaptation gradient techniques (e.g., LMS) for the pre-cursor (CM1) and optionally the main-cursor (C0) tap weights and these weights are adapted over a given period in the TX Adaptation unit 162 utilizing an error value, $e_k$, from the receiver 114. In some embodiments, the main cursor has a fixed, non-adaptable value. As will be explained in more detail below, the post-cursor (CP1) tap weight is adapted using another approach as described in connection with FIGS. 5-8. For purposes here and as will be explained in more detail in connection with FIG. 3, the error value $e_k$ is a signal related to a difference between each data bits decoded by the receiver 114 (output y from data and error latches 164) and the signal received from the communication media 212 after being processed h the equalizers in block 166.

Figure 3:
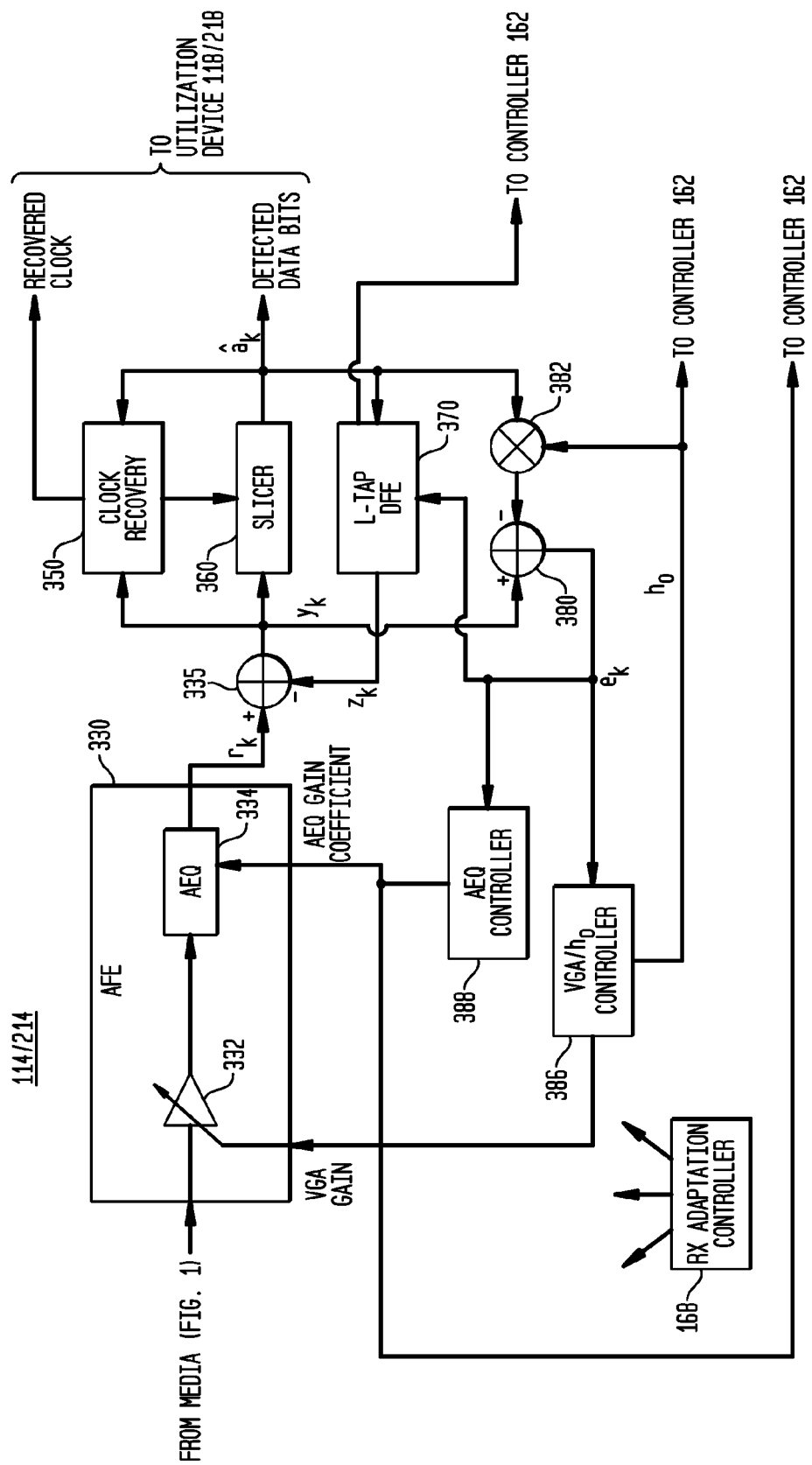
FIG. 3 is a simplified block diagram of a receiver in FIG. 1 incorporating an analog front end (AFE), clock recovery circuitry, and a DFE-based equalizer.
Figure 4:
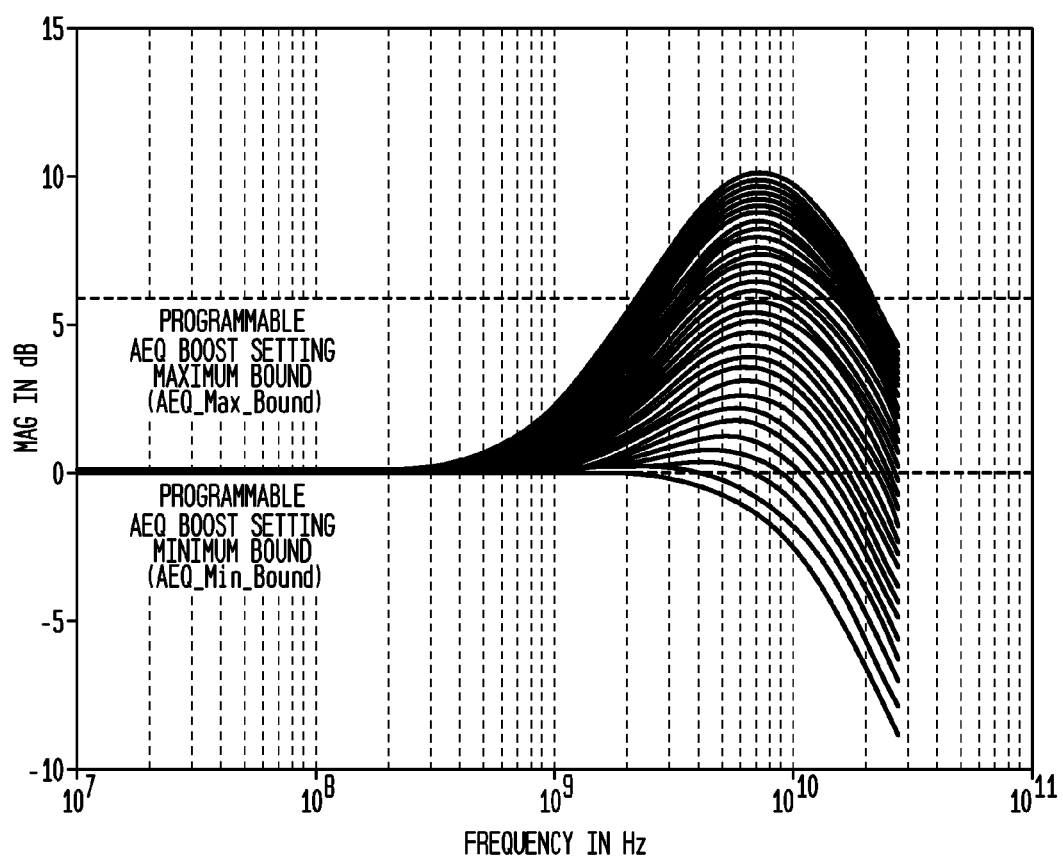
FIG. 4 is an exemplary plot of a gain transfer characteristic of the AFE.

FIG. 3 is a block diagram of an exemplary one of the receivers 114, 214 that incorporates a traditional DFE-based equalizer in addition to analog front-end equalization. As shown in FIG. 3, the data is transmitted through the media (FIG. 1) and the analog signal from the media is filtered or equalized by an analog front end (AFE) 330 having in combination a variable gain amplifier (VGA) 332 for amplitude control and an analog linear equalizer (AEQ) 334. The VGA 332 imparts overall gain to signals applied to the input of the AFE 330 and the AEQ 334 provides a high-frequency boost or peaking to the signals applied to the input of the AFE 330. As illustrated in FIG. 4, the AFE 334 can provide different levels of high-frequency boost, here having a center frequency of about 7 GHz, with a nominal gain of zero to about ten dB depending on the AEQ gain coefficient control signal from AEQ controller 338 (FIG. 3). The VGA 332 imparts a level of gain, in response to a control signal from VGA/$h_0$ controller 386, that is added to the nominal (0 dB) gain of the AEQ 332.

The minimum and maximum AEQ boost settings, AEQ_Min_Bound and AEQ_Max_Bound, respectively, are set depending on the performance of the AEQ 334 and desired distribution of equalization between the receiver 114/214 and corresponding transmitter 216/116. AEQ_Min_Bound is programmable but is typically set to approximately zero, the level at which the. AEQ provides no significant boost or peaking. AEQ_Max_Bound is programmable but is typically set several dB below the maximum boost the AEQ capable of. This allows for the AEQ to continue adapting and providing additional boost when more analog equalization is needed after the TXFIR post-cursor is "frozen" once the receiver and transmitter are initially adapted to each other. The AEQ_Max_Bound might be adjusted up or down depending on the amount of post-cursor boost desired by the TXFIR 254 because too much post-cursor boost might generate unacceptable levels of crosstalk by the transmitter while too little post-cursor boost results in the AEQ providing so much boost that more noise than signal is amplified by the AFE 330, detrimentally impacting the overall performance of the system.

The analog signal output $r_k$ of the AFE 330 passes through subtractor 335, used in conjunction with an decision feedback equalizer (DFE) 370 having L taps as described below, and is then sampled by a clock/data recovery (CDR) circuit 350. A slicer 360 (described below and part of data and error latches 164 of FIG. 1) digitizes the output $y_k$ of the subtractor 335 by comparing the sample to an exemplary threshold of zero in response to the data clock generated by the CDR 350 and latches the result.

As previously indicated, the slicer 360 can be implemented as a slicer-latch (i.e., a decision device based on an amplitude threshold and a latch to hold the results of the decision device) or a more complicated detector such as a sequence detector. For high-speed applications, the slicer 360 is often implemented as a slicer-latch that is clocked by a CDR-generated clock. In addition to sampling the data signal, the slicer 360 essentially quantizes the signal to a binary "1" or "0" based on the sampled analog value and a slicer threshold, $s_t$. If the input to the slicer 360 at time k is $y_k$, then the detected data bit output, $\hat{\alpha}_k$ of the slicer 360 is given as follows:

$\hat{\alpha}_k = 1$ if $y_k > s_t$ $= 0$ otherwise.

In this example, the slicer 360 has a slicer threshold $s_t$ of zero.

The phase of the analog waveform is typically unknown and there may be a frequency offset between the frequency at which the original data was transmitted and the nominal receiver sampling clock frequency. The function of the CDR 350 is to properly sample the analog waveform such that when the sampled waveform is passed through a slicer 360, the data is recovered properly despite the fact that the phase and frequency of the transmitted signal is not known. The CDR 350 is conventional and is often an adaptive feedback circuit and the feedback loop adjusts the phase and frequency of the nominal clock to produce a modified recovered clock that can sample the analog waveform to allow proper data detection.

In general, the CDR 350 may be composed of several components, such as a phase detector, a loop filter, and a clock generation circuit (not shown), In one embodiment, the CDR 350 comprises a bang-bang phase detector (BBPD). For a general discussion of bang-bang phase detectors, see, for example, J. D. H. Alexander, "Clock Recovery from Random Binary Signals," Electronics Letters, 541-42 (October, 1975), incorporated by reference herein in its entirety. Alternatively, the CDR 350 comprises a Mueller-Muller CDR where the signals are sampled at the baud-rate. For a general discussion of Mueller-Muller CDR, see, for example, K. Mueller and K. Muller, "Timing Recovery in Digital Synchronous Data Receivers," IEEE Trans. Comm., Vol. 24, No. 5, May 1976, pp. 516-531, incorporated by reference herein in its entirety.

Exemplary operation of L-tap DFE 370 is as follows. It is noted that the DFE equalizer described herein is well known and considered an analog implementation because compensation is done in the analog domain even though part of the equalizer is implemented in digital form but might be implemented in an all-digital form. A DFE correction, $z_k$, generated by a DFE filter 370 is subtracted by an analog summer 335 from the output, $r_k$, of the AFE 330 to produce a DFE corrected signal $y_k$, where $y_k = r_k - z_k$. Then the DFE-corrected signal $y_k$ is detected by a slicer 360 to produce the detected data bits $\hat{a}_k$.

Because the output of slicer 360 (the detected data bits $\hat{a}_k$) is used by filter 370 to produce the DFE output $z_k$, the filter 370 uses past corrected detected data to produce the DFE output $z_k$. For one embodiment of the filter 370, the output of the DFE filter 370 is:

$$z_k = \Sigma h_i^L \hat{a}_k(-i)$$

where $h_i$ represents the coefficients or weights of the L-tap DFE fitter 370 and $\hat{a}_k(-i)$ represents past data decisions from the slicer 360. Further explanation of the filter 370 and alternative embodiments thereof may be found in the U.S. Pat. No. 8,467,440 by Aziz et al, titled "Compensated Phase Detector for Generating One or More Clock Signals Using DFE Detected Data in a Receiver" incorporated herein by reference in its entirety. The value of the tap weights $h_i$ is determined during a training period by analyzing an error signal, $e_k$, described in more detail below. Generally and as well understood in the art, a receiver adaptation unit 168 (FIG. 1) coupled to the DFE 370 varies the tap weights using an exemplary least-mean-squared (LMS) algorithm to minimize the error signal $e_k$. Alternatively, other iterative adaptation algorithms may be used.

The error signal $e_k$ is generated by subtractor 380 taking the difference between the DFE-corrected signal $y_k$ and a weighted version of the detected data bit generated by multiplier 362 multiplying together the detected data bit value $\hat{a}_k$ and the adaptable weight $h_0$. The weight $h_0$ is related to the amplitude of the outer eye opening of the received signal and is generated by VGA/$h_0$ controller 386. Subtractor 380 and multiplier 382 are part of the data and error latches 164 of FIG. 1.

The VGA/$h_0$ controller 386, which can be implemented by the receiver adaptation unit 168, receives the error signal $e_k$ and controls the gain of the VGA 332 and determines the average amplitude of the outer eye opening of the equalized received signals. Generation of the VGA control signal and $h_0$ is conventional and is discussed in detail in, for example, Published U.S. Patent Application 2013/0077669 titled "Method of Compensating for Nonlinearity in a DFE-based Receiver" by A. Malipatil et al, incorporated by reference herein in its entirety.

As with the VGA/$h_0$ controller 386, the AEQ controller 388 is conventional and receives the error signal $e_k$ to generate the AEQ gain control signal to set the level of peaking by the AEQ 386. During the training or adaptation phase of the receiver, the controller 388, responsive to the error signal $e_k$, converges one or more coefficient values of the AEQ 334 either to reduce intersymbol interference during eye openings or to reduce signal transition jitter. Either technique is well known in the art and is similar to the DFE adaptation technique described above. Further, controllers 386, 388 might use signals other than $e_k$ as a feedback signal for adaptation, e.g., using data eye monitoring techniques as taught in U.S. Pat. No. 8,369,470 by Mobin et al., titled "Methods and Apparatus for Adapting One or More Equalization Parameters by Reducing Group delay Spread", incorporated herein by reference in its entirety.

Returning to FIG. 1, the TXFIR filter tap weights are calculated by TX Adaptation unit 162 with two different processes, one for the post-cursor tap weight CP1 and one for the precursor CM1 and optionally for the main cursor C0 tap weights. As will be explained in more detail below in connection with FIGS. 5-8, the TXFIR tap weights are generated based on the error signal $e_k$ and receiver coefficients from the receiver adaptation unit 168. It is understood that the TX and RX adaptation units might be combined and might be implemented by processor 150 as desired.

The ports 110, 210 calculate the TXFIR filter tap weights differently depending on the standard being implemented. In the aforementioned PCIe standard, the TXFIR filter tap weights are calculated following a certain set of rules (as explained in more detail below in connection with FIG. 5) and they are communicated to the link partner port 210 by encoding the transmitter filter tap weights in an outbound training sequence (TS1) order set frame in frame mapper 170 and sent via channel 120 operating as a back-channel. In the aforementioned SAS-3, 16GFC, and 10GBASE-KR standards, the filter tap weights increment or decrement information is encoded in the outbound update field of a training frame sent to the link partner port 210 via channel 120 operating as a back-channel. The controller 250 and framer 252 will parse the received transmitter update information and update the TXFIR tap weights in transmitter 216 provided the allowed range limit for the tap weights has not been reached. After an update has taken place, the link partner port 210 will provide feedback to the local port 110 through channel 220 using an outbound training frame that might have known training data therein. In PCIe standard, the updated transmitter tap weights will be broadcasted back in the above-mentioned TS1 order set. In SAS-3, 16GFC, and 10G-KR standards, the transmitter update feedback information will be encoded in the status report field of the training frame indicating a successful update, or no update yet, or the transmitter filter tap weight reached its range limit.

Once the new transmitter filter tap weights are activated in the TXFIR, the receiver 114 readapts the VGA, AEQ, and DFE coefficients. After an appropriate amount of time is allocated for the receiver 114 to reacquire the change in dynamics of the transmitter 216 due to the TXFIR filter tap weights changes, the TXFIR filter tap weights are readjusted as needed until convergence in the tap weights occurs. The receiver 114 might adapt its VGA, AEQ, and DFE coefficients following the TXFIR tap weights update in accordance with, for example, that disclosed in "Method and Apparatus for Generating One or More Clock Signals for a Decision-Feedback Equalizer Using DFE Detected Data", by Aziz et al, U.S. Pat. No. 7,616,686, incorporated by reference herein in its entirety.

As will be explained in more detail in connection with FIG. 5, transmitter adaptation will end when the TXFIR filter tap weights have converged. Various convergence detection schemes can be employed for this purpose. If the convergence is not detected within the allocated time, the back-channel adaptation might end with a timeout established by a timer (not shown). In accordance with the aforementioned PCIe standard, the maximum allocated back-channel adaptation time is limited to 24 ms, while in the aforementioned SAS-3, 16GFC, and 10G-KR standards, the time limit is 500 ms.

An exemplary operation of the overall adaptation process in accordance with the present invention is illustrated in FIG. 5. For purposes of this description, the operation is described in connection to the aforementioned PCIe standard but may be applied to any of the above-mentioned standards. Adaptation of the transmitter 116/receiver 214 can be done using the same process as described but for purposes of simplicity, adaptation of the receiver 114 and transmitter 216 is described herein.

Beginning with step 502, the TXFIR filter tap weights and receiver filter coefficients are set to default or known values. Concomitantly, the local port 110 and the link partner port 210 (FIG. 1) might negotiate with each other the speed of the channels 120 and 220. In essence, the ports negotiate the highest speed that the channels can communicate and is typically determined by the hardware limitations of the respective ports. An example of this can be found in the aforementioned PCIe standard regarding phases zero and one in the initialization process described therein. Reference may be made to the PCIe standard or any of the other aforementioned standards for a more complete understanding of the speed negotiation phase.

Generally, step 502 is accomplished using prearranged TXFIR tap weights or last used tap weights for the TXFIR filter 254 (FIG. 2) and the equalizers in block 166 of the receiver 114 (FIG. 3). After the tap weights are initialized, the transmitter 216 generates a known training sequence for the receiver 114 to adapt to.

Once the filters are initialized, an adaptation step 504 is initiated in which the equalizers and filters in the receiver 114 adapt to the known sequence carried by the communication media 222. Once convergence in the receiver coefficients occurs, then a post-cursor adaptation step 506 begins as will be described in more detail in connection with FIGS. 6-8. For purposes here, the post-cursor tap weight (CP1) adaptation takes into consideration the values of certain receiver coefficients to determine if the post-cursor tap weight is to be increased, decreased, or left unchanged. Thereafter, in step 508 the post-cursor tap weight value CP1 is sent via the back-channel 120 for use by the TXFIR filter 254. Next, the receiver readapts in step 510, and in step 512 the precursor (CM1) tap weight value is calculated and sent to the TXFIR filter 254 via the back-channel 120. If, in step 516, the tap weights for the TXFIR 254 have converged, e.g. the magnitude of the tap weight values from steps 506 and 512 do not change more than a certain amount from previous values, then the adaptation process is ended, otherwise steps 504-516 are repeated until convergence of all the TXFIR tap weights occurs. Once the adaption ends, then in step 518 the TXFIR tap weights are "frozen" and then, in optional step 520, the receiver continues to adapt to received signals to compensate for changes in, for example, temperature and data traffic pattern characteristics. It is understood that other conventional convergence techniques might be used instead of that discussed above.

As illustrated in FIGS. 6 - 8, there are three exemplary techniques described herein for post-cursor tap weight adaptation. Which of the post-cursor adaptation process of FIGS 6 - 8 to be used for post-cursor adaptation may be selected by a user based on receiver and system characteristics as described below.

Exemplary details of step 506 are shown in FIG. 6. In this embodiment, the process 600 increases, decreases, or leaves unchanged the TXFIR post-cursor tap weight depending on the level of peaking provided by the AEQ 334 in AFE 330 (FIG. 3) and the average amplitude of the opening of the outer eye, $h_0$, as determined by the VGA/$h_0$ controller 386. Starting with step 602, the amount of gain provided by the AEQ 334 is checked against a minimum AEQ bound, AEQ_Min_Bound, such as that shown in FIG. 4, to see if it is less than the minimum bound. If so, then in step 604 the TXFIR post-cursor tap weight is reduced by a known amount and control passes to step 508 of FIG. 5 and as described above. However, if the amount of AEQ gain is not less than the minimum AEQ bound, then control passes from step 602 to step 606 where the average amplitude in the outer eye opening ($h_0$) as determined by controller 386 is compared to a minimum outer eye amplitude bound, Outer_Eye_Min_Bound. If $h_0$ is less than the minimum outer eye amplitude bound, then control passes to step 604 as described above. if $h_0$ is not less than the minimum outer eye amplitude bound, then in step 608 the AEQ gain is checked against a maximum AEQ bound, AEQ_Max_Bound, such as that shown in FIG. 4, to see if is greater than the maximum bound. If so, then in step 610 the TXFIR post-cursor tap weight is increased by the known amount and control passes to step 508 in FIG. 5. Otherwise, control passes directly to step 508 and the TXFIR post-cursor tap weight is not changed. This process has been found to achieve consistent, repeatable convergence of the post-cursor tap weight when the AFE 330 cannot provide sufficient overall gain and might be incapable of providing sufficient peaking levels by the AEQ 334. In addition, the level of the bounds might be set depending on the desired distribution of equalization levels between the transmitter and receiver during the initial equalization.

In another embodiment, the details of step 506 are shown in FIG. 7. In this embodiment, the process 700 increases, decreases, or leaves unchanged the TXFIR post-cursor tap weight depending on the level of peaking provided by the AEQ 334 in AFE 330 (FIG. 3) and the average amplitude of the opening of the outer eye, $h_0$, as determined by the VGA/$h_0$ controller 386. Steps 702-710 are substantially the same as the corresponding steps 602-610 in FIG. 6. However, in step 706, if $h_0$ is less than the minimum outer eye amplitude bound, then control passes to step 508 and the TXFIR post-cursor tap weight is not changed. The process 700 might be preferred over process 600 when the AFE 330 is capable of providing sufficient overall gain but is incapable of providing sufficient peaking levels by the AEQ 334.

Because there is a tradeoff between the AEQ gain and the tap weight values of the DFE, in an alternative embodiment a DFE tap weight is used in conjunction with the AEQ gain to determine the amount of post-cursor used b the TXFIR. As shown in FIG. 8, the process 800 increases, decreases, or leaves unchanged the TXFIR post-cursor tap weight depending on the level of the first tap weight ($h_1$) of the DFE 370 (FIG. 3), the AEQ gain, and the average amplitude of the outer eye opening, $h_0$ as determined by the VGA/$h_0$ controller 386.

The DFE tap weight $h_1$ represents the gain of the DFE at the Nyquist frequency of the input data applied to the AFE 330 (FIG. 3). Since $h_1$ is typically a digital value, it is less susceptible to crosstalk than the typically analog AEQ gain signal so that the TXFIR post-cursor adaptation might be more robust than AEQ gain-only embodiments.

Starting with step 802, the DFE tap weight $h_1$ is checked against a minimum $h_1$ bound, H1_Min_Bound, typically set to approximately zero. If so, then in step 804 the TXFIR post-cursor tap weight is reduced by a known amount and control passes to step 508 of FIG. 5 and as described above. However, if $h_1$ is not less than H1_Min_Bound, then control passes from step 802 to step 806 where the average amplitude of the outer eye opening ($h_O$) as determined by controller 386 is compared to the minimum outer eye amplitude bound, Outer_Eye_Min_Bound. If $h_O$ is less than the minimum outer eye amplitude bound, then control passes to step 804 as described above. If $h_O$ is not less then the minimum outer eye amplitude bound, then in step 808 the AEQ gain is checked against a maximum AEQ bound, AEQ_Max_Bound, such as that shown in FIG. 4, to see if is greater than the maximum bound. If so, then in step 810 the TXFIR post-cursor tap weight is increased by the known amount and control passes to step 508 in FIG. 5. Otherwise, control passes directly to step 508 and the TXFIR post-cursor tap weight is not changed.

In an alternative embodiment similar to that in FIG. 8, instead of using the AEQ gain in step 808, tap weight $h_1$ is checked against a maximum $h_1$ bound, H1_Max_Bound (not shown). The bounds H1_Min_Bound and H1_Max_Bound are set to tradeoff the equalization balance between the TXFIR and the DFE. For example, H1_Max_Bound is set so if $h_1$ exceeds the bound, then the TXFIR post-cursor should be increased since the receiver is under-equalized. Similarly, H1_Min_Bound is set so that if $h_1$ dips below the bound, then the TXFIR post-cursor should be decreased since receiver is over-equalized.

In these embodiments, the processes disclosed in FIGS. 5-8 are implemented in the receiver adaptation controller 168 in conjunction with the transmitter adaptation controller 162. It is understood that the above-described processes might be implemented in a processor 150 alone or by one or more other processors in the system 100.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable. Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method comprising:
   receiving, over a forward channel, a signal from a transmitter having after being filtered by a filter therein with at least one adjustable tap weight;
   equalizing the received signal using an adaptive equalizer having at least one control signal, wherein the adaptive equalizer is a decision feedback equalizer, wherein the at least one control signal is an adaptive tap weight;
   adjusting at least one transmitter filter tap weight based on the at least one control signal of the equalizer, wherein the adjusted at least one transmitter filter tap weight is adjusted downward when the adaptive tap weight is less than a limit value: and
   transmitting the adjusted at least one transmitter filter tap weight to the transmitter using a reverse channel.

2. The method of claim 1 wherein the transmitter filter is a finite impulse response filter and the adjusted at least one transmitter filter tap weight is a post-cursor tap weight.

3. The method of claim 2 wherein the step of adjusting the at least one transmitter filter tap weight comprises the steps of:
   comparing the at least one control signal to the limit value; and
   adjusting the post-cursor tap weight up or down based on the results of the comparing step.

4. The method of claim 3 further comprising the steps of:
   calculating, based at least in part on an error signal generated by the decision feedback equalizer, a pre-cursor tap weight of the transmitter filter; and
   transmitting the pre-cursor tap weight to the transmitter using the reverse channel;
   wherein the limit value is substantially zero.

5. The method of claim 4 wherein
   the transmitted pre-cursor tap weights
   is loaded into the transmitter filter.

6. The method of claim 4 wherein if the transmitted pre-cursor tap weight does not change more than a pre-determined amount from a previous value, adjusting ends and the transmitter filter tap weight has converged.

7. The method of claim 3 further comprising the step of:
   equalizing the received signal using an adaptive analog equalizer disposed between the forward channel and the decision feedback equalizer, the adaptive analog equalizer having an analog equalizer gain coefficient;
   wherein the adjustment of the post-cursor tap weight is additionally based on the analog equalizer gain coefficient.

8. The method of claim 7 wherein the adaptive analog equalizer is a peaking filter with an amount of peaking determined by the analog equalizer gain coefficient, and the analog equalizer gain coefficient is adaptively adjusted in response to an error signal from the decision feedback equalizer.

9. The method of claim 8, wherein if the measured outer eye is greater than the minimum outer eye amplitude, the measured outer eye is compared to a maximum outer eye amplitude, and wherein if the measured outer eye is not greater than the maximum outer eye amplitude, the post-cursor tap weight does not change.

10. The method of claim 7 further comprising the step of:
measuring an outer eye of the equalized received signal from the adaptive analog equalizer to determine an amplitude of the outer eye;
wherein the post-cursor tap weight is reduced if the amplitude of the measured outer eye is less than a minimum outer eye amplitude.

11. The method of claim 3 further comprising the steps of:
calculating, based at least in part on an error signal generated by the decision feedback equalizer, a pre-cursor tap weight of the transmitter filter; and
transmitting the pre-cursor tap weight to the transmitter using the reverse channel.

12. The method of claim 1 further comprising the step of:
initializing the transmitter filter tap weights and the at least one control signal to known values before the step of equalizing the received signal.

13. A method comprising:
receiving, over a forward channel, a signal from a transmitter after being filtered by a filter therein with at least an adjustable post-cursor tap weight;
equalizing the received signal using an adaptive analog equalizer coupled to the forward channel, the adaptive analog equalizer having an analog equalizer gain coefficient, and wherein equalizing the equalized received signal from the adaptive analog equalizer using a decision feedback equalizer having adaptive tap weights;
adjusting the post-cursor tap weight of the transmitter filter based on the analog equalizer gain coefficient, wherein the post-cursor tap weight is reduced if at least one of the adaptive tap weights of the decision feedback equalizer is less than a limit value; and
transmitting the adjusted post-cursor tap weight to the transmitter using a reverse channel.

14. The method of claim 13 wherein the post-cursor tap weight is reduced if the analog equalizer gain coefficient is less than a minimum analog gain value, and the post-cursor tap weight is increased if the analog equalizer gain coefficient is greater than a maximum analog gain value.

15. The method of claim 13 further comprising the step of:
measuring an outer eye of the equalized received signal to determine an amplitude thereof;
wherein the post-cursor tap weight is increased if the amplitude of the measured outer eye is not less than a minimum outer eye amplitude and the analog equalizer gain coefficient is greater than a maximum analog gain value.

16. The method of claim 13 further comprising the step of:
measuring an outer eye of the equalized received signal to determine an amplitude thereof;
wherein the post-cursor tap weight is reduced if the amplitude of the measured outer eye is less than a minimum outer eye amplitude.

17. The method of claim 13 wherein the limit value is substantially zero and the at least one adaptive tap weight is an $h_1$ tap weight of the decision feedback equalizer.

18. The method of claim 13 wherein the transmitter filter is a finite impulse response filter, the adaptive analog equalizer is a peaking filter with an amount of peaking determined by the analog equalizer gain coefficient, and the analog equalizer gain coefficient is adaptively adjusted in response to an error signal from the decision feedback equalizer.

19. The method of claim 18 further comprising the steps of:
calculating, based at least in part on an error signal generated by the decision feedback equalizer, a pre-cursor tap weight of the transmitter filter;
transmitting the pre-cursor tap weight to the transmitter using the reverse channel.

20. The method of claim 19 further comprising the step of:
repeating all of the recited receiving, equalizing, calculating, adjusting, measuring, and transmitting steps until the transmitter filter tap weights have converged.

* * * * *